Patented Feb. 24, 1953

2,629,751

UNITED STATES PATENT OFFICE 2,629,751

HYDROGENATED 1,1,3-TRIMETHYL-3-PHENYL INDANE

Glenn C. Wiggins, Midland, Mich., assignor to The Dow Chemical Company, Midland, Mich., a corporation of Delaware No Drawing. Application January 26, 1950, Serial No. 140,756

2 Claims. (Cl. 260—667)

This invention concerns certain new compounds, namely 1,1,3-trimethyl-3-cyclohexyl indane and 1,1,3-trimethyl-3-cyclohexyl hexahydroindane, and relates to a method of making the same.

The new compounds are colorless, or nearly colorless, viscous liquids. They are effective as plasticizers for polystyrene resins and are particularly useful as addition agents for increasing the flow of polystyrene during usual compression or injection molding operations. The compounds may also find application in electrical insulation such as for impregnating paper employed in the manufacture of power cables.

According to the invention, the new compounds 1,1,3-trimethyl-3-cyclohexyl indane and 1,1,3-trimethyl-3-cyclohexyl hexahydroindane are prepared by hydrogenating 1,1,3-trimethyl-3-phenyl indane at elevated temperatures and pressures in the presence of a hydrogenating metal such as nickel, platinum, or palladium, as catalyst.

The hydrogenation metals are employed in an extremely fine state of subdivision either alone, or supported on suitable inert materials such as kieselguhr, Filtercel, or other diatomaceous earth, or activated charcoal. The catalyst may be used in amounts corresponding to from 0.05 to 20 per cent by weight, or more, of the metal, based on the weight of the 1,1,3-trimethyl-3-phenyl indane starting material, but an amount of the catalyst of from 0.1 to 10 per cent, is preferred.

The 1,1,3-trimethyl-3-phenyl indane starting material is a known compound melting at approximately 52° C. It is the saturated cyclic dimer of alpha-methyl styrene. It can readily be prepared by reacting two molecules of alpha-methyl styrene with each other in the presence of a solvent such as benzene or petroleum ether, at room temperature or below, in the presence of concentrated sulfuric acid as a catalyst. The compound is recovered by washing the reaction mixture with water, or an aqueous solution of an alkali such as a 5 weight per cent solution of sodium hydroxide, to remove or neutralize the acid and distilling the oil layer to separate the 1,1,3-trimethyl-3-phenyl indane, or in other usual ways, e. g. by crystallization.

The hydrogenation reaction is usually carried out at a reaction temperature between 150° and 350° C., preferably from 170° to 325° C., and at superatmospheric pressures of from 150 to 600 pounds per square inch, although greater pressures may be used.

In carrying out the hydrogenation reaction, it has been observed that the addition of hydrogen to aromatic nuclei of the 1,1,3-trimethyl-3-phenyl indane starting material proceeds toward the formation of 1,1,3-trimethyl-3-cyclohexyl indane in a nearly quantitative manner. The latter product, or compound, is then hydrogenated upon continued treating of the same with hydrogen in the presence of the catalyst, to form 1,1,3-trimethyl-3-cyclohexyl hexahydroindane, although the latter hydrogenation usually proceeds at a somewhat slower rate under similar reaction conditions. Thus, to prepare 1,1,3-trimethyl-3-cyclohexyl indane as the principal product, the hydrogenation reaction is discontinued when an amount of hydrogen corresponding to approximately six gram atomic weights of the hydrogen have been consumed in the reaction per gram molecular weight of the 1,1,3-trimethyl-3-phenyl indane used.

In practice, the 1,1,3-trimethyl-3-phenyl indane starting material is placed in a suitable pressure resistant vessel, together with the desired proportion of a hydrogenation catalyst. The vessel is flushed with hydrogen to remove air or oxygen, then sealed and sufficient hydrogen added thereto to produce a pressure of from 150 to 600 pounds per square inch. The mixture is agitated, heated to a reaction temperature between 150° and 350° C., and subjected to the pressure of hydrogen until sufficient hydrogen has reacted to form the desired product. Thereafter, the vessel is cooled and its contents removed and filtered to separate the catalyst from the hydrogenated product. The hydrogenated product may be further purified by distillation.

The following examples illustrate ways in which the principle of the invention has been applied, but are not to be construed as limiting the invention.

EXAMPLE 1

A charge of 1000 grams (4.24 moles) of 1,1,3-trimethyl-3-phenyl indane melting at 52° C., together with 50 grams of a nickel-on-diatomaceous earth hydrogenating catalyst containing 35 per cent by weight of nickel, was placed in a pressure resistant vessel. The vessel was flushed with hydrogen to remove air, then sealed and the mixture subjected to a hydrogen pressure of 375 pounds per square inch, gauge. The mixture was agitated and heated to a temperature of 150° C., over a period of 3 hours. Thereafter, the mixture was heated to a temperature of 250° C. while maintaining the hydrogen pressure at approximately 375 pounds per square inch for 3 hours longer. Approximately 26 gram atomic weights of hydrogen were absorbed in the reaction. The vessel was cooled, and its contents removed and filtered to separate the catalyst from the hydrogenated product. The product was a colorless liquid and was obtained in nearly quantitative yield. 400 grams of the filtered product were distilled over a 1 inch diameter by 48 inches long fractionating column. There were obtained 376 grams of 1,1,3-trimethyl-3-cyclohexyl indane boiling at 108°–110° C. at 0.5 millimeter absolute pressure and 24 grams of liquid residue, principally column hold up. The 1,1,3-trimethyl-3-cyclohexyl indane is a new compound having the probable structural formula:

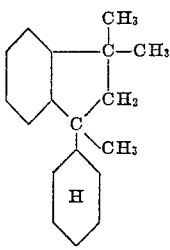

The material boiling at 108°–110° C. at 0.5 millimeter absolute pressure had an index of refraction $n_D^{27.5°}=1.5215$ and a specific gravity of 0.951 at 27° C.

EXAMPLE 2

A charge of 500 grams of 1,1,3-trimethyl-3-phenyl indane, together with 110 grams of a nickel-on-diatomaceous earth hydrogenation catalyst containing 35 per cent by weight of nickel, was placed in a pressure resistant vessel. The mixture was agitated, subjected to a hydrogen pressure of 300 pounds per square inch gauge and heated to a temperature of 170° C. The temperature of the mixture was gradually raised from 170° to 230° C. over a reaction period of 26 hours, while maintaining the pressure at approximately 300 pounds by adding hydrogen to the vessel to replace that consumed in the reaction. Upon completion of the reaction, the vessel was cooled, and its contents removed and filtered to separate the catalyst from the hydrogenated product. There were obtained 509 grams of liquid product. It was fractionally distilled. There were obtained 279 grams of 1,1,3-trimethyl-3-cyclohexyl hexahydroindane boiling at 105°–115° C. at 1.5 millimeters absolute pressure, 186 grams of the same boiling at a constant temperature of 115° C. at 1.5 millimeters pressure, together with 35 grams of lower boiling ingredients and 9 grams of liquid higher boiling residue. The 1,1,3-trimethyl-3-cyclohexyl hexahydroindane is a new compound having the probable structural formula:

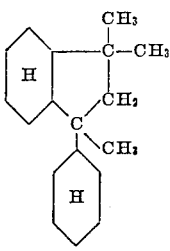

The material boiling at 105°–115° C. at 1.5 millimeters pressure had a specific gravity of 0.9375 at 25° C. compared to water at the same temperature and an index of refraction $n_D^{25°}=1.5052$.

The material boiling at a constant temperature of 115° C. at 1.5 millimeters had a specific gravity of 0.9365 at 25° C. compared to water at the same temperature and an index of refraction $n_D^{25°}=1.5035$. It was analyzed for per cent carbon and hydrogen.

|  | C | H |
|---|---|---|
| Found | 86.87 | 12.86 |
| Theory | 87.02 | 12.98 |

EXAMPLE 3

A charge of 1000 grams (4.24 moles) 1,1,3-trimethyl-3-phenyl indane melting at 52° C., together with 10 grams of a palladium-on-charcoal hydrogenation catalyst containing 5 weight per cent of palladium metal, was placed in a pressure resistant vessel. The vessel was flushed with hydrogen to remove air, then sealed and the mixture subjected to a hydrogen pressure of 300 pounds per square inch, gauge. The mixture was agitated and heated to a temperature of 170° C. for a period of 8 hours. Thereafter, the temperature of the mixture was raised to 250° C. and gradually increased to 325° C. over a reaction period of 12 hours longer. The pressure of hydrogen was maintained at 300 pounds per square inch by feeding hydrogen to the reaction from an auxiliary tank. Approximately 52 gram atomic weights of hydrogen were absorbed in the reaction. The vessel was cooled, and its contents removed and filtered to separate the catalyst. There were obtained 1004 grams of liquid hydrogenated product. It was fractionally distilled. There were obtained 903 grams of 1,1,3-trimethyl-3-cyclohexyl hexahydroindane boiling at 110°–115° C. at 1.5 millimeters absolute pressure, together with 84 grams of lower boiling ingredients and 17 grams of higher boiling residue.

EXAMPLE 4

A purpose of this example is to illustrate the effect of incorporating 1,1,3-trimethyl-3-cyclohexyl indane with polystyrene, particularly with regard to increasing the rate of flow of the polystyrene during usual compression or injection molding operations. In each of a series of experiments, 200 grams of a mixture consisting of styrene and 1,1,3-trimethyl-3-cyclohexyl indane from Example 1, in the proportions stated in the following table, was sealed in a glass container. The mixtures were polymerized by heating the containers to a temperature of 95° C. over a period of 3 days, then heating the same to a temperature of 200° C., over a period of 4 days. The products were cooled and the solid polymer from each of the mixtures was removed from the container and crushed to a granular form. The polymer from each of the mixtures was tested to determine its flow property and a viscosity characteristic. The rate of flow at 135° C. in terms of seconds required for a sample of the material to flow 1½ inches through a ⅛ inch orifice under an applied pressure of 1000 pounds per square inch was determined in accordance with procedure described in A. S. T. M. D569–44T. The viscosity characteristic was determined by dissolving a portion of the polymeric product in toluene to form a solution containing 10 per cent by weight of said product and determining the absolute viscosity in centipoises at 25° C. of the solution. The following table states the proportion of styrene and 1,1,3-trimethyl-3-cyclohexyl indane in the starting material in per cent by weight and gives the flow property of the polymer in seconds. The table also gives the viscosity characteristic of the polymer solution in centipoises at 25° C. For purpose of comparison polystyrene prepared under similar polymerization conditions is also included in the table. In the table the letters TMCI are used to represent 1,1,3-trimethyl-3-cyclohexyl indane.

Table

| Run No. | Starting Materials | | Polymer | |
|---|---|---|---|---|
| | Percent Styrene | Percent TMCI | Flow Rate, Seconds | Viscosity, cps. |
| 1 | 100 | 0 | 248 | 185.5 |
| 2 | 99 | 1 | 163 | 157.5 |
| 3 | 97 | 3 | 103 | 164 |
| 4 | 95 | 5 | 72 | 138.5 |

Other modes of applying the principle of the invention may be employed instead of those explained, change being made as regards the steps or compounds herein employed, provided the steps or compounds stated in any of the following claims or the equivalent of such stated steps or compounds be employed.

I claim:

1. A method of making 1,1,3-trimethyl-3-cyclohexyl indane which comprises subjecting 1,1,3-trimethyl-3-phenyl indane to hydrogen at a pressure of from 150 to 600 pounds per square inch and a reaction temperature between 150° and 350° C. in the presence of a hydrogenation catalyst selected from the group consisting of nickel and palladium until the chemical addition of six atoms of hydrogen per mole of the 1,1,3-trimethyl-3-phenyl indane is obtained, then discontinuing the hydrogenation reaction.

2. A process for making 1,1,3-trimethyl-3-cyclohexyl indane which comprises subjecting 1,1,3-trimethyl-3-phenyl indane to hydrogen at a pressure of from 150 to 600 pounds per square inch and a reaction temperature between 150° and 350° C. in the presence of a nickel hydrogenation catalyst, continuing the reaction until the chemical addition of six atoms of hydrogen per mole of the 1,1,3-trimethyl-3-phenyl indane is obtained, then discontinuing the hydrogenation reaction and separating 1,1,3-trimethyl-3-cyclohexyl indane from the reaction mixture.

GLENN C. WIGGINS.

REFERENCES CITED

The following references are of record in the file of this patent:

UNITED STATES PATENTS

| Number | Name | Date |
|---|---|---|
| 2,106,735 | Gwynn | Feb. 1, 1938 |
| 2,249,987 | Stanley et al. | July 22, 1941 |
| 2,514,546 | Ipatieff et al. | July 11, 1950 |

OTHER REFERENCES

Adkins et al., J. Amer. Chem. Soc., 63, 1320–5 (1941), abstracted in Chemical Abstracts 35:4371[8].

Plattner et al., Helv. Chim. Acta, 29, 1432–8 (1946), abstracted in Chemical Abstracts 41:2027[a].